(12) United States Patent
Bosio

(10) Patent No.: US 9,644,352 B2
(45) Date of Patent: *May 9, 2017

(54) KITCHEN SINK SPRAYER

(71) Applicant: AMFAG S.P.A., Casaloldo (IT)

(72) Inventor: Orlando Bosio, Casaloldo (IT)

(73) Assignee: AMFAG S.P.A., Casaloldo (IT)

(*) Notice: Subject to any disclaimer, the term of this patent is extended or adjusted under 35 U.S.C. 154(b) by 0 days.

This patent is subject to a terminal disclaimer.

(21) Appl. No.: 14/873,648

(22) Filed: Oct. 2, 2015

(65) Prior Publication Data

US 2016/0024763 A1 Jan. 28, 2016

Related U.S. Application Data

(63) Continuation of application No. 14/140,182, filed on Dec. 24, 2013, now Pat. No. 9,174,228, which is a
(Continued)

(30) Foreign Application Priority Data

May 5, 2010 (IT) .............................. MI2010A0785

(51) Int. Cl.
*B05B 7/02* (2006.01)
*E03C 1/04* (2006.01)
(Continued)

(52) U.S. Cl.
CPC .............. *E03C 1/0404* (2013.01); *B05B 1/02* (2013.01); *B05B 1/1618* (2013.01);
(Continued)

(58) Field of Classification Search
CPC ................. E03C 1/0404; E03C 1/0405; E03C 2001/0415; F16L 27/12
(Continued)

(56) References Cited

U.S. PATENT DOCUMENTS 5,546,978 A 8/1996 Parker
5,934,325 A 8/1999 Brattoli et al.
(Continued)

FOREIGN PATENT DOCUMENTS

EP          1 825 919      8/2007
WO    WO 2006/094424      9/2006

OTHER PUBLICATIONS

Italian Search Report, issued Jan. 21, 2011 for Italian Application No. MI2010A000785.
(Continued)

*Primary Examiner* — Steven J Ganey
(74) *Attorney, Agent, or Firm* — Pearl Cohen Zedek Latzer Baratz LLP

(57) ABSTRACT

A kitchen sink sprayer, comprising a body enclosed in an outer enclosure for being gripped and provided with a coupling to a flexible water supply hose connected to a faucet for adjusting the flow-rate between a closed position and an open position, the body comprising a rod which has, at one end, a tip that is adapted to open selectively the access of the water to a duct for forming a central jet and to ducts for forming a peripheral jet, and is provided with means for actuation by the user, the means for actuating the rod having a tab which is connected directly to the rod in an intermediate position of the rod and protrudes from the enclosure of the sprayer, at its lateral surface, by an extent that is sufficient for contact grip by the user when it is necessary to actuate the rod in order to move it from one of its selection positions to the other and vice versa.

4 Claims, 4 Drawing Sheets

Related U.S. Application Data continuation of application No. 13/097,582, filed on Apr. 29, 2011, now Pat. No. 8,727,241.

(51) Int. Cl.
*B05B 1/02* (2006.01)
*B05B 1/30* (2006.01)
*B05B 15/06* (2006.01)
*B05B 9/01* (2006.01)
*F16L 27/12* (2006.01)
*B05B 1/16* (2006.01)
*B05B 12/00* (2006.01)
*B05B 1/18* (2006.01)

(52) U.S. Cl.
CPC .......... *B05B 1/1636* (2013.01); *B05B 1/3013* (2013.01); *B05B 1/3026* (2013.01); *B05B 1/3046* (2013.01); *B05B 9/01* (2013.01); *B05B 12/002* (2013.01); *B05B 15/061* (2013.01); *B05B 15/066* (2013.01); *B05B 15/068* (2013.01); *E03C 1/0405* (2013.01); *F16L 27/12* (2013.01); *B05B 1/18* (2013.01); *E03C 2001/0415* (2013.01)

(58) Field of Classification Search
USPC ....... 239/443, 446–449, 525, 526, 530, 569, 239/583, 587.1, 588, 600; 4/675, 677, 4/678; 137/801; 285/302
See application file for complete search history.

(56) References Cited

U.S. PATENT DOCUMENTS

| | | | |
|---|---|---|---|
| 6,619,567 | B1 | 9/2003 | Ouyoung |
| 6,938,837 | B2 * | 9/2005 | Nelson ...................... B05B 1/16 239/588 |
| 7,000,854 | B2 | 2/2006 | Malek et al. |
| 7,331,536 | B1 | 2/2008 | Zhen et al. |
| 7,344,095 | B1 | 3/2008 | Hsu |
| 7,494,074 | B2 * | 2/2009 | Benstead .............. B05B 1/1618 239/449 |
| 7,607,588 | B2 | 10/2009 | Nobili |
| 7,871,020 | B2 | 1/2011 | Nelson et al. |
| 2005/0189438 | A1 | 9/2005 | Bosio |
| 2007/0018019 | A1 | 1/2007 | Nobili |
| 2007/0200014 | A1 | 8/2007 | Nobili |
| 2008/0067264 | A1 | 3/2008 | Erickson et al. |
| 2008/0302886 | A1 | 12/2008 | Hodel et al. |

OTHER PUBLICATIONS

Office Action for U.S. Appl. No. 14/140,182, mailed on Aug. 29, 2014.

Final Office Action for U.S. Appl. No. 14/140,182, mailed on Mar. 26, 2015.

* cited by examiner

KITCHEN SINK SPRAYER

CROSS-REFERENCE TO RELATED APPLICATIONS

This application is a continuation of U.S. patent application Ser. No. 14/140,182, filed Dec. 24, 2013, which is a continuation of U.S. patent application No. 13/097,582, filed Apr. 29, 2011, now U.S. Pat. No. 8,727,241, issued May 20, 2014, which claimed the benefit of Italian Patent Application No. MI2010A000785, filed May 5, 2010, all of which are incorporated by reference herein.

BACKGROUND OF THE INVENTION

The invention relates to a kitchen sink sprayer.

It is known that many kitchen sinks are provided with faucets for supplying water and for adjusting the flow of the water between full open and closed positions, which comprise, accommodated in an adapted duct, a flexible hose that extends at one end from said faucet and is provided, at the other end, with an element known as a sprayer, which is designed to be gripped by the user in order to achieve two goals.

First of all, the sprayer can be managed in order to make the flow of water exit in different positions within the sink, and furthermore the sprayer can be required, by way of a simple actuation of means with which it is provided, to determine the outflow of the water in the form of a central jet or of a peripheral jet.

The sprayer comprises a body which is enclosed in an outer enclosure for being gripped by the user and is provided with a coupling to the flexible water supply hose, and such body comprises a rod provided, at one end, with a tip that is adapted to open selectively the access of the water to ducts for forming the central jet and to ducts for forming the peripheral jet, and is provided with actuation means that allow the user to move it from one of the two selection positions to the other and vice versa.

The rod actuation means that are known in the background art have all a certain constructive complexity and a consequent rather substantial space occupation, which in any case is such as to constitute a crucial obstacle in the process of sprayer miniaturization that today is an essential condition for the commercial success thereof.

SUMMARY OF THE INVENTION

The aim of the present invention is to provide a sprayer in which the rod actuation means have a space occupation reduced to a minimum, so as to allow maximum miniaturization of the sprayer.

This aim is achieved by a kitchen sink sprayer according to the invention, characterized in that it comprises the features disclosed in the appended claims.

BRIEF DESCRIPTION OF THE DRAWINGS

Further characteristics and advantages will become better apparent from the description of a preferred but not exclusive embodiment of the kitchen sink sprayer according to the invention, illustrated by way of non-limiting example in the accompanying drawings, wherein.

DETAILED DESCRIPTION OF THE INVENTION

Figure 1:
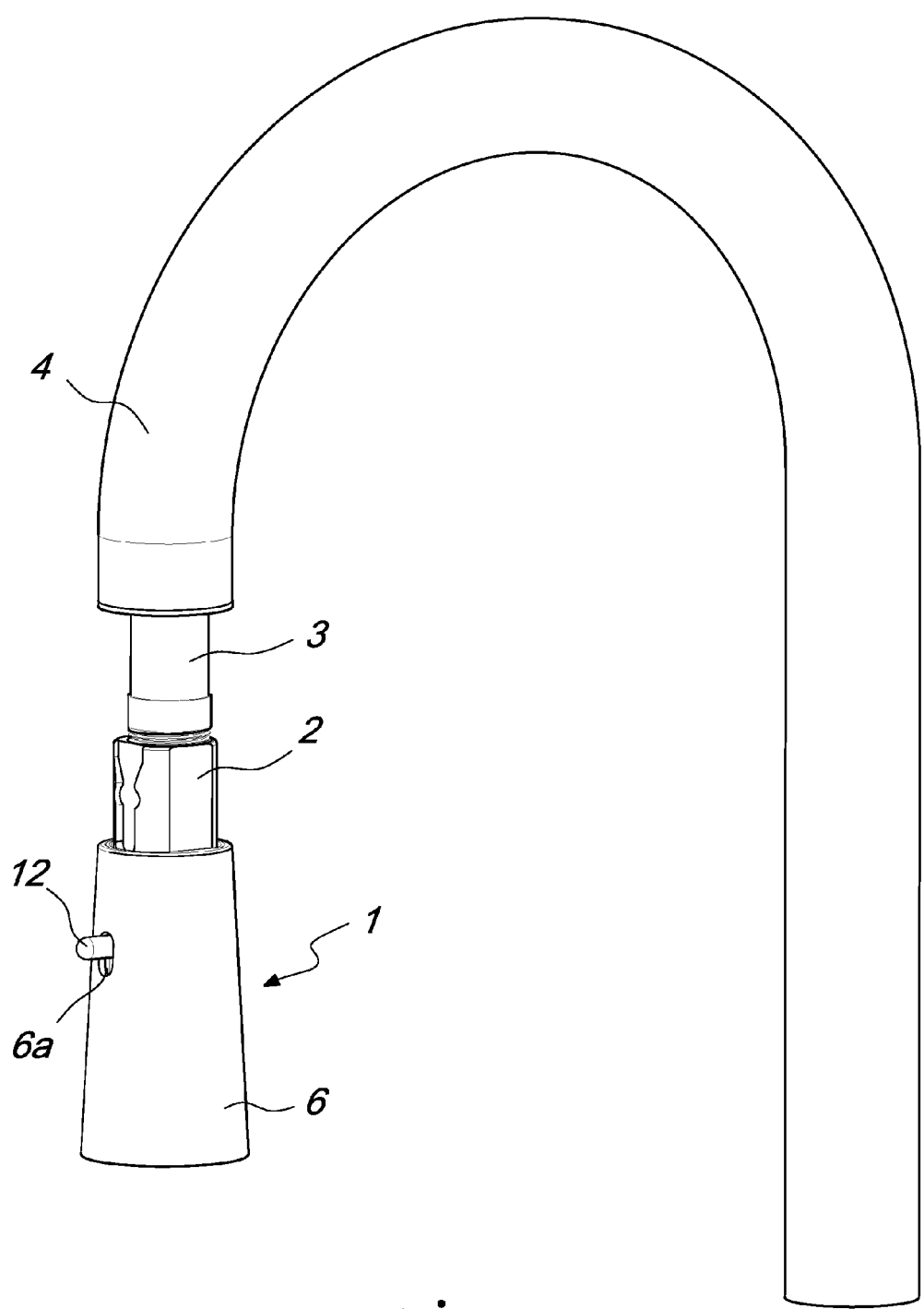
FIG. 1 is a perspective view of a sprayer of the invention connected to one end of the flexible hose accommodated in the adapted duct that extends from a faucet, not shown in the figure.

With reference to the figures, the reference numeral 1 generally designates a sprayer, connected by means of a coupling 2 to one end of a flexible hose 3 that is accommodated in an adapted duct 4 and extends at the other end from a faucet, which is not shown in the figures, and adjusts the flow-rate of the water between the two extreme positions of being fully open and fully closed.

The sprayer 1 comprises a body 5, which is held in position in an outer enclosure 6 for being gripped by the user, together with the coupling 2, by a plug 7, which comprises at least one duct 8 provided with an aerator 9 for providing the outflow of the water in the form of a central jet, and at least one and preferably two ducts 10a, 10b for forming a peripheral jet.

Figure 2:
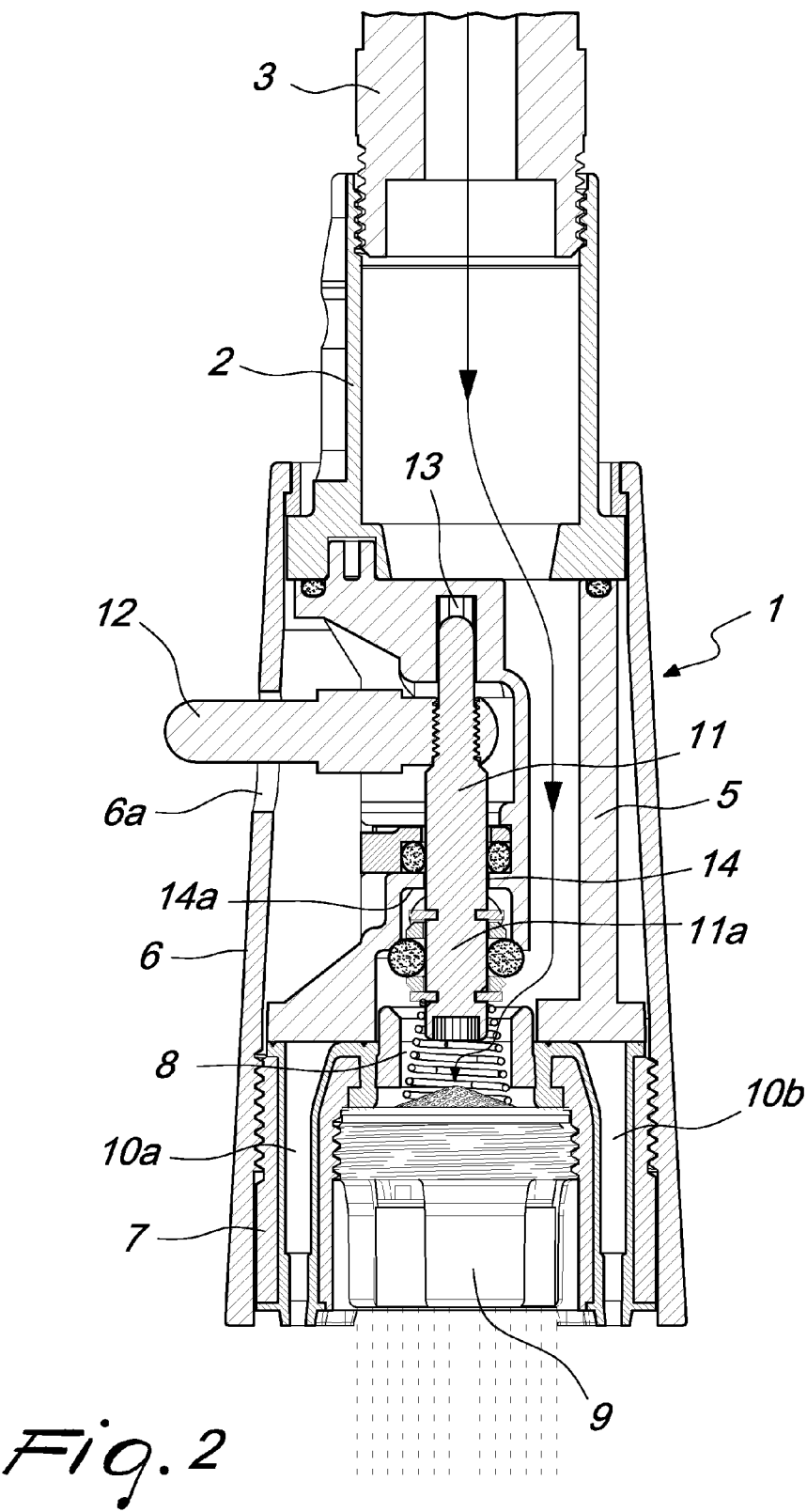
FIGS. 2 and 3 are sectional views of the sprayer respectively in the central jet condition and in the peripheral jet condition.
Figure 3:
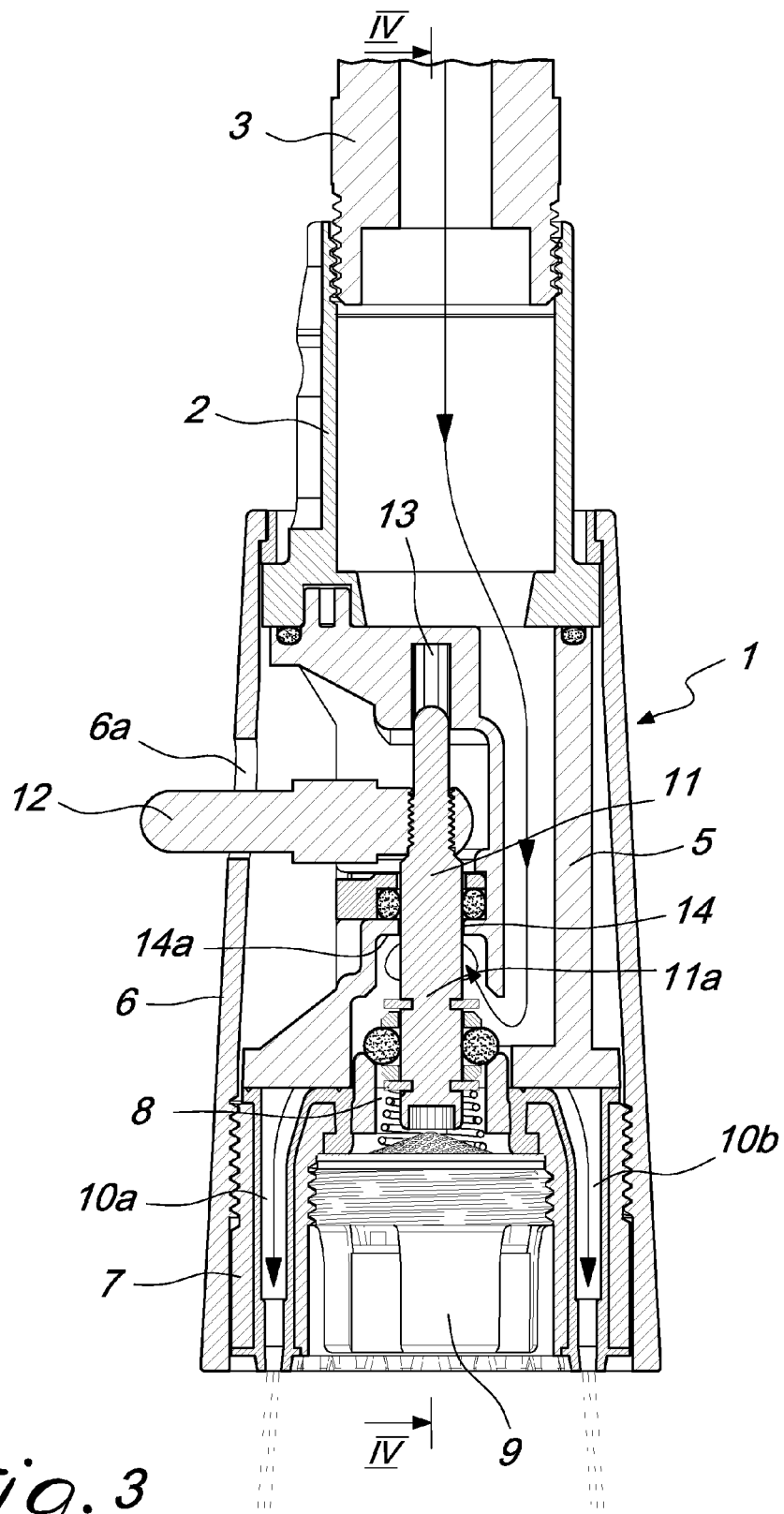
Figure 4:
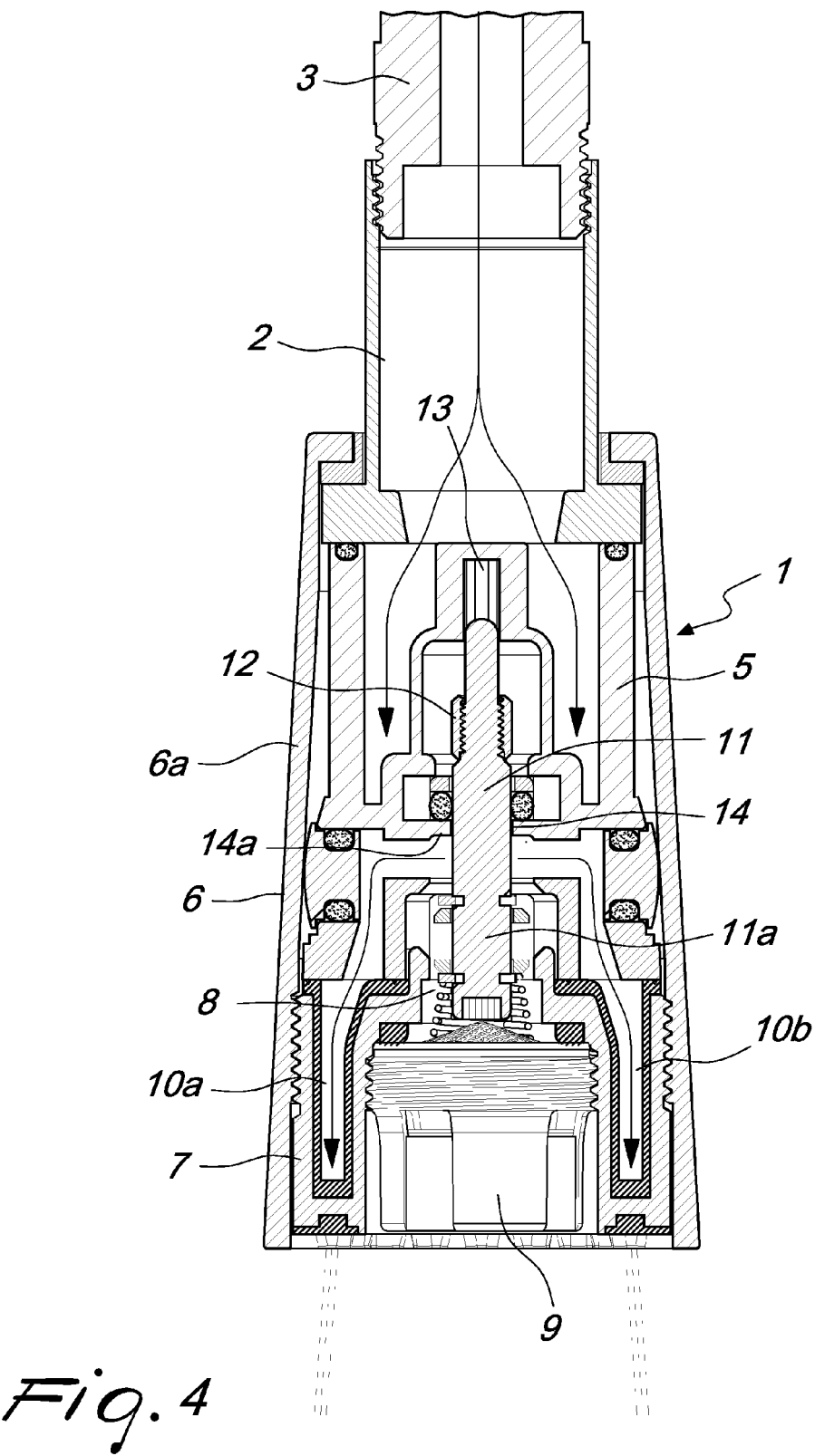
FIG. 4 is a sectional view taken along the line IV-IV of FIG. 3.

Within the body 5 a rod 11 is provided, which has a tip 11a that is adapted to assume, as a consequence of the actuation applied by the user on the rod 11, the two positions shown respectively in FIGS. 2 and 3, so as to open selectively the access of the water, shown by means of arrows in the figures, to the duct 8 for providing a central jet, as in FIG. 2, and to the ducts 10a, 10b for providing a peripheral jet, as in FIG. 3.

An important feature of the invention resides in that the means for the actuation of the rod 11 comprise a tab 12, which is connected directly thereto by means of a thread and protrudes from the outer enclosure 6 through a slot 6a by an extent that is sufficient for contact grip by the user when it is necessary to actuate the rod 11 to move it from one of its selection positions to the other and vice versa.

The rod 11 is guided in its movements by guiding means which are constituted by a seat 13 that accommodates the upper end of the rod, and by the walls of a hole 14 provided in a ridge 14a, said guiding means being arranged on opposite sides with respect to the coupling position of the tab 12, so as to offer maximum effectiveness. The extreme simplicity of the actuation means of the rod 11 that are present in the invention is evident from what has been described; this makes it possible to reduce the space occupation of the sprayer to levels that would be impossible by adopting means of the type proposed by the background art.

In fact, it is sufficient to consider, merely by way of example, that by adopting a conical outer enclosure 6 such as the one shown in the figures it is possible to provide a sprayer which, starting from a diameter of 28 mm at the base, blends without discontinuities with a duct 14, which has a diameter equal to 24 mm, such dimensions being unattainable without the adoption of the means proposed by the invention.

The described invention is susceptible of numerous modifications and variations, all of which are within the scope of the inventive concept: the tab 12 can be, for example, jointly connected to the rod 11 in any manner, and the sprayer can comprise, in a known manner, a spring which automatically determines the return to the central jet position from the peripheral jet position when the faucet is closed.

The invention claimed is:

1. A kitchen sink sprayer, comprising:
a body enclosed in an outer enclosure for being gripped by a user and provided with a coupling to a flexible water supply hose, which is adapted to be connected to a faucet for adjusting the flow-rate between a closed position and an open position;
said body comprising inside it a rod that has, at one end, a tip adapted to open selectively the access of the water to at least one duct for forming a central jet and to at least one duct for forming a peripheral jet, and is provided with an actuating element,
wherein said actuating element comprises a tab that is solidly attached to said rod and protrudes from the outer enclosure of the sprayer, at the lateral surface thereof, by an extent that is sufficient for contact grip by the user when it is necessary to actuate said rod to move it from one of its selection positions to the other and vice versa, and
wherein said rod has a longitudinal axis, said rod being slidingly guided in said body in a sliding direction corresponding to said longitudinal axis of said rod, and said tab being movably guided exclusively in a single sliding direction that is parallel to said longitudinal axis.

2. The sprayer according to claim 1, further comprising a guide for guiding the rod in its motion, which are arranged on opposite sides with respect to the coupling position of the tab on said rod.

3. The sprayer according to claim 1, wherein the tab of the rod protrudes from the outer enclosure of the sprayer in a direction perpendicular to said longitudinal axis of said rod at a slot provided on said enclosure.

4. A kitchen sink sprayer, comprising:
a body enclosed in an outer enclosure for being gripped by a user and provided with a coupling to a flexible water supply hose, which is adapted to be connected to a faucet for adjusting the flow-rate between a closed position and an open position;
said body comprising inside it a rod that has, at one end, a tip adapted to open selectively the access of the water to at least one duct for forming a central jet and to at least one duct for forming a peripheral jet, and is provided with an actuating element, wherein said actuating element comprises a tab that is connected by threading directly to said rod and protrudes from the outer enclosure of the sprayer, at the lateral surface thereof, by an extent that is sufficient for contact grip by the user when it is necessary to actuate said rod to move it from one of its selection positions to the other and vice versa, and
wherein said rod has a longitudinal axis and said threading extends about said longitudinal axis, said rod being slidingly guided in said body in a sliding direction corresponding to said longitudinal axis of said rod, and said tab being movably guided exclusively in a single sliding direction that is parallel to said longitudinal axis.

* * * * *